United States Patent [19]

Sansone

[11] 3,996,598
[45] Dec. 7, 1976

[54] ATTACHABLE POCKET CAMERA LENS AND BRACKET

[75] Inventor: Anthony Sansone, Stamford, Conn.

[73] Assignee: The Raymond Lee Organization, Inc., New York, N.Y.; a part interest

[22] Filed: Nov. 10, 1975

[21] Appl. No.: 630,465

[52] U.S. Cl. .............................. 354/295; 350/257; 354/286

[51] Int. Cl.² ........................................ G03B 17/56

[58] Field of Search ................. 350/252, 257, 318; 354/80, 81, 82, 189, 286, 295, 296, 202, 197; 355/39

[56] References Cited

UNITED STATES PATENTS

| 2,615,366 | 10/1952 | Rothweiler | 355/39 |
| 3,622,239 | 11/1971 | Miller | 355/39 |
| 3,747,490 | 7/1973 | Brandt | 354/286 |
| 3,812,509 | 5/1974 | Westphaler | 354/295 X |

Primary Examiner—Edna M. O'Connor
Attorney, Agent, or Firm—Howard I. Podell

[57] ABSTRACT

An adapter unit which mounts an auxiliary lens or filter in front of the lens of a pocket camera such as the Kodak Pocket 60 camera. The unit is formed of an L-shaped bracket fitted with a through slot in each leg of the bracket. One slot is fastened by a retaining screw to the tripod mount on the underside of the camera, with the other leg extending beyond the front and below the camera lens. A lens frame member is fastened to the leg projecting beyond the camera lens, to mount in a plane perpendicular to the camera lens axis in front of the camera lens. The lens frame member is formed with slots on the interior edges of the frame members for retaining a lens, filter or other lens accessory, with the rim of the top lens frame member hingeable to permit sliding of such lens accessory into or out of the lens frame.

3 Claims, 5 Drawing Figures

ATTACHABLE POCKET CAMERA LENS AND BRACKET

SUMMARY OF THE INVENTION:

My invention is an adapter unit which mounts an auxiliary lens or filter in front of the lens of a pocket camera such as the Kodak Pocket 60 camera. The unit is formed of an L-shaped bracket fitted with a through slot in each leg of the bracket. One slot is fastened by a retaining screw to the tripod mount on the underside of the camera, with the other leg extending beyond the front and below the camera lens. A lens frame member is fastened to the leg projecting beyond the camera lens, to mount in a plane perpendicular to the camera lens axis in front of the camera lens. The lens frame member is formed with slots on the interior edges of the frame members for retaining a lens, filter or other lens accessory, with the rim of the top lens frame member hingeable to permit sliding of such lens accessary into or out of the lens frame.

The lens frame member is of a size to fit in front of the camera lens and the photo-electric eye of a camera equipped with a photo-electric sensor and is fitted with a screw mounted in a slot in the bottom leg of the frame member so that the frame member may be slid in a direction transverse to the camera lens axis when fastening the slidable mounting screw to the lens adapter bracket.

BRIEF DESCRIPTION OF THE DRAWINGS:

The objects and features of the invention may be understood with reference to the following detailed description of an illustrative embodiment of the invention, taken together with the accompanying drawings in which.

Figure 1:
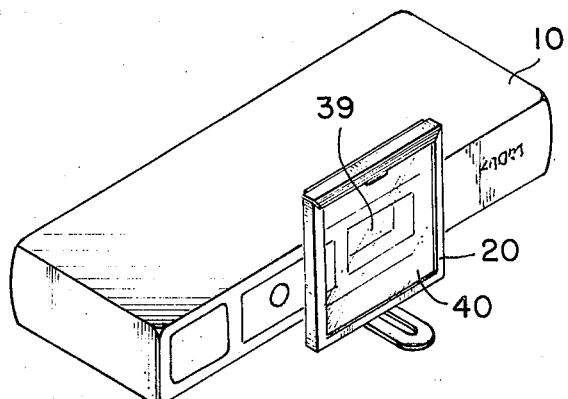
FIG. 1 is a perspective view of the invention installed on a camera.
Figure 4:
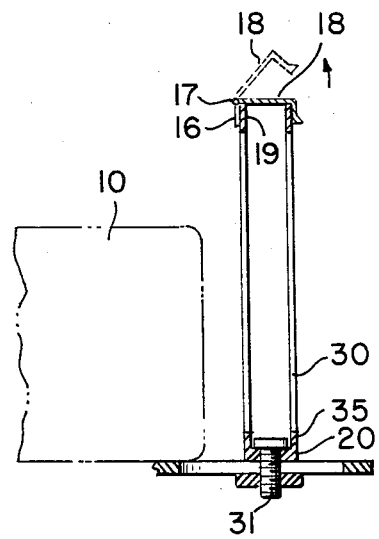
FIG. 4 is a side sectional view of the lens mount frame taken along line IV—IV of FIG. 2.
Figure 2:
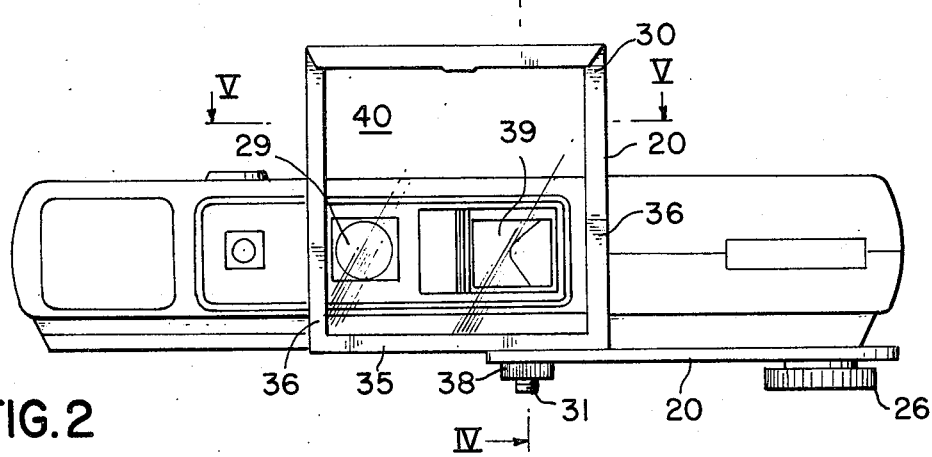
FIG. 2 is an elevation view of the invention and mounted camera.
Figure 3:
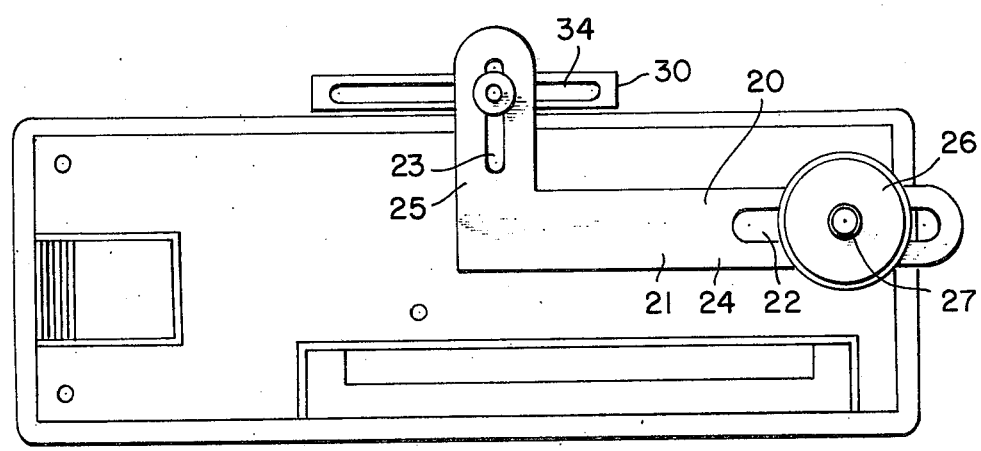
FIG. 3 is a bottom plan view of the invention and camera.
Figure 5:
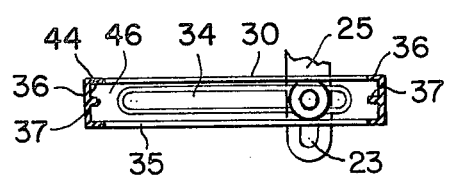
FIG. 5 is a plan sectional view of the lens mount frame taken along line V—V of FIG. 2.

DESCRIPTION OF THE PREFERRED EMBODIMENT:

Turning now descriptively to the drawings, in which similar reference characters denote similar elements throughout the several views, FIGS. 1–5 illustrate a pocket camera 10 to which the auxiliary lens adapter 20 is attached.

Adapter 20 consists of an L-shaped bracket 21 formed with a slot 22 and 23 in each leg 24 and 25 respectively, with slots 22 and 23 oriented along the direction of the longitudinal axis of its respective leg.

A fastening screw 26 is mounted through leg slot 22 into the female thread of the tripod mount fitting of the camera to fasten bracket 20 to the camera 10. Screw 26 is formed with a female thread 27 to serve as a means of fastening a tripod to the camera 10 with screw 26 in place.

A lens frame 30 is fastened to bracket leg 25 by a screw 31 through a slot 34 in the bottom segment 35 of lens frame 30 which is bolted into slot 23 of bracket 20 by a nut 38. Since the axis of slot 34 is perpendicular to the axis of slot 23 in the assembled position, a lens 40 or filter plate mounted in lens frame 30 may be adjusted in location both transversely and axially with regard to the camera lens which is exposed through camera lens opening 39.

Lens frame 30 is of a size to cover both the camera lens opening 39 and the camera photo sensor opening 29 so that the effect of a lens or filter in lens frame 30 will automatically regulate the effect of the camera photo sensor.

Lens frame 30 is formed of a bottom segment 36 and two opposed side segments 36 each of which is formed as a U-shape segment open to the recess bounded by the frame. A ridge 37 projects from the inner side wall surface 44 of the side segments 36 to serve as a partition to divide recess 46 of the U-shaped side segments 36 into two sections, each of which may retain the edges of a filter plate.

The top segment 19 of frame 30 is formed as a U-shaped section with the top section 18 fastened by a hinge 17 to the rear side section 16 of the segment 19, so that top section 18 may rotate as shown by dash lines to permit insertion or removal of a lens 40 or filter plate in frame 30.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by Letters Patent of the U.S. is:

1. An assembly adaptable for fastening to a camera for mounting an auxiliary lens or filter in front of the lens of the camera comprising
   a bracket in the form of an L-shaped plate having two legs, with a slot formed in each of the said two legs of the plate,
   an open rectangular shaped frame formed of two U-shaped side sections joined to a U-shaped bottom section, with the recesses of the side and bottom sections facing the center of the frame,
   said bottom section of the frame formed with a slot in an intermediate segment of the U-shaped bottom section, together with
   fastening means for joining the frame to a first leg of the bracket through the respective slots in the frame and said first leg,
   said first leg of the bracket of a size to extend beyond the front of an attached camera, when the second leg of the bracket is bolted to the female thread of the tripod mount fitting of the camera.

2. The combination as recited in claim 1 together with an auxiliary lens mounted in the open frame.

3. The combination as recited in claim 2 together with a camera to which the assembly is mounted.

* * * * *